United States Patent [19]

Patte et al.

[11] Patent Number: 4,729,775
[45] Date of Patent: Mar. 8, 1988

[54] DEVICE FOR SCRUBBING A POLLUTED GAS

[75] Inventors: Philippe Patte, Nancy; Andre Cordier, Clamart, both of France

[73] Assignee: Air Industrie Systems, France

[21] Appl. No.: 20,991

[22] Filed: Mar. 2, 1987

[30] Foreign Application Priority Data

Feb. 3, 1987 [FR] France ................ 87 01387

[51] Int. Cl.$^4$ ................ B01D 19/00
[52] U.S. Cl. ................ 55/241; 55/DIG. 46; 261/108; 98/115.2
[58] Field of Search ............ 55/240, 241, 84, 90, 55/93; 261/108, 109, 110, DIG. 54; 98/115.2

[56] References Cited

U.S. PATENT DOCUMENTS

| 4,299,602 | 11/1981 | Cordier et al. | 55/240 |
| 4,328,012 | 5/1982 | Telchuk et al. | 55/240 |
| 4,515,073 | 5/1985 | Dorsch et al. | 55/DIG. 46 |

Primary Examiner—Bernard Nozick
Attorney, Agent, or Firm—Larson and Taylor

[57] ABSTRACT

A device is provided for scrubbing a polluted gas in which this gas passes through at least one sheet of a scrubbing liquid. The device comprises trickle walls (7) which together define a first opening (8), a first transverse wall (12) disposed beneath the first opening, and a trickle passage with a vertical axis, surrounding the first transverse wall, and limited by two confining walls (10) attached to the underside of the trickle walls on either side of the first opening. Inside the trickle passage, under the first transverse wall (12), further walls (15) are arranged defining a second opening (16), with a second transverse wall (17) being disposed beneath the second opening.

9 Claims, 4 Drawing Figures

DEVICE FOR SCRUBBING A POLLUTED GAS

FIELD OF THE INVENTION

The invention concerns a device for scrubbing a polluted gas of the type in which the polluted gas passes through at least one sheet or curtain of scrubbing liquid. As will be explained, the invention particularly, but not exclusively, concerns a scrubbing device for a polluted gas containing solid and/or liquid particles in suspension which must be eliminated, and in particular, to separating fine particles of paint which are present in the air drawn from paint rooms, such as are used, for example, in the automobile industry to paint auto bodies.

BACKGROUND OF THE INVENTION

Devices for scrubbing polluted gas are known which comprise trickle walls that are inclined toward each other and define an opening therebetween; means for causing the scrubbing liquid to trickle or stream down these walls; and means for providing circulation of the polluted gas to be scrubbed downwardly from above through the opening between the trickle walls. With such an arrangement, the scrubbing liquid trickles down the inclined walls, flows through the opening between the walls, and forms a liquid sheet or curtain through which the polluted gas must pass before being discharged to a location outside of the paint room.

In prior art installations it has been proposed to provide that the opening between the trickle walls is disposed above a transverse wall with a continuous contour or extent equal to, or preferably larger than, that of the opening between the trickle walls. Thus, with this arrangement, the scrubbing liquid strikes this transverse wall and is diverted to the side thereby before falling into a collection basin or receptacle below. By virtue of the provision of this transverse wall, it is possible to obtain a sheet of scrubbing liquid of predetermined dimensions. However, when purified gas is extracted from the side, this arrangement has the drawback of causing the droplets of scrubbing liquid to be carried off with the purified gas, because the scrubbing liquid is turned into a spray when striking the transverse wall.

In order to avoid this drawback, it has been proposed in the prior art to surround the opening between the trickle walls, and the transverse wall, with walls defining a trickle passage having vertical axis, the trickle passage being open at the bottom end thereof and the walls being affixed at the tops thereof to the undersides of the trickle walls.

New regulations have been promulgated with respect to atmospheric pollution which are stricter than former regulations, and as a consequence, the scrubbing devices, or scrubbers, for the air drawn from paint rooms must now operate with greatly reduced charges of paint in the circulating air so as to diminish the discharge into the atmosphere of paint particles whcih are not collected by the scrubber. Accordingly, paint particles of very small dimensions (smaller than 1 micrometer) are used and these are the most difficult to collect. Collection of these paint particles requires the consumption of more energy as the size of the particles decreases resulting in a scrubber with a greater loss of charge into the circulating air.

To satisfy the requirements mentioned above, scrubbers used in paint rooms have operated with losses of between 80 and 120 mm (water column). Under these conditions, the scrubbers are not very noisey (approximately 82 dBA), the carrying off of droplets of scrubbing liquid is limited to acceptable ratios, and the paint particle content in the air discharged into the atmosphere is between 5 and 10 mg/m$^3$ depending on the types of paints being used, the conditions of application of the paint (manual gun, robot gun, pneumatic, or electrostatic) and the quantities of paint being sprayed.

However, when prior art scrubbing devices such as those described above have been operated with higher losses of charge, e.g., 200 to 300 mm (water column) in order to satisfy the requirements of the new air pollution regulations, in other words, so that the paint particle content in the air drawn from the paint rooms is equal to or lower than 3 mg/m$^3$, for example, a number of problems have developed.

In particular, it has been shown that certain scrubbers do not operate correctly when a certain loss of charge, referred to as the critical loss of charge, is exceeded, and the emission of paint particles, instead of continuing to decrease, suddenly increases to high levels (10 to 20 mg/m$^3$).

It has also been shown that while certain other scrubbers operate correctly, with the effectiveness of collection provided thereby increasing in relation with the loss of charge, other problems have occurred which are incompatible with industrial usage. These problems include an intense operational noise, of 90 to 95 dBA, which is above the permitted standard, and a large amount of droplets of scrubbing liquid being carried away, these droplets carrying with them paint particles collected by the scrubbing liquid. The result is a deposit of paint on the walls of the casings and fans for extraction of the air from the paint room, and this requires frequent cleaning, necessitating stopping the installation, and discharging of droplets of scrubbing liquid charged with paint particles into the atmosphere.

Thus, despite the creation of heavy losses of charge in the prior art scrubbers, requiring great energy consumption, a satisfactory result has not been obtained which overcomes all of the various problems discussed above.

As a solution, the attachment of a second scrubber to the existing scrubber has been proposed in order to avoid these problems and drawbacks. Such a scrubber can be placed either beneath the first scrubber, or outside the paint spray room, in the chimney for evacuation of air from the room. However, such an additional scrubber is cumbersome and its use requires an additional investment for the construction of the paint room.

SUMMARY OF THE INVENTION

An important object of the present invention is to provide a scrubbing device or scrubber for polluted gases which remedies the aforementioned drawbacks and problems of the prior art and which also satisfies the requirements of the new regulations concerning the discharge of pollutants into the atmosphere.

More specifically, a chief object of the invention is to provide a scrubbing device for a polluted gas of the type in which the polluted gas passes through at least one sheet or curtain of a scrubbing liquid, the scrubbing device comprising trickle walls defining an opening therebetween; means for feeding scrubbing liquid to the trickle walls so that the scrubbing liquid streams down the trickle walls; means for causing the polluted gas to circulate downwardly from above; a transverse wall disposed beneath the opening; and means defining a trickle passage with vertical axis, surrounding the transverse wall, the trickle passage being limited by two confining walls attached and sealed at the top ends thereof to the underside of the trickle walls, on either side of the opening and spaced from the edges of the opening, and the scrubbing device being characterized in that, within the trickle passage, under the transverse wall, further walls are provided which are attached at one end to corresponding confining walls and the other ends of which are spaced apart to define a second opening, the device also including a further transverse wall disposed beneath this second opening.

It will be understood that other features and advantages of the invention will be set forth in, or apparent from, the detailed description of the preferred embodiments of the invention which follows.

DESCRIPTION OF THE PREFERRED EMBODIMENTS

Figure 1:
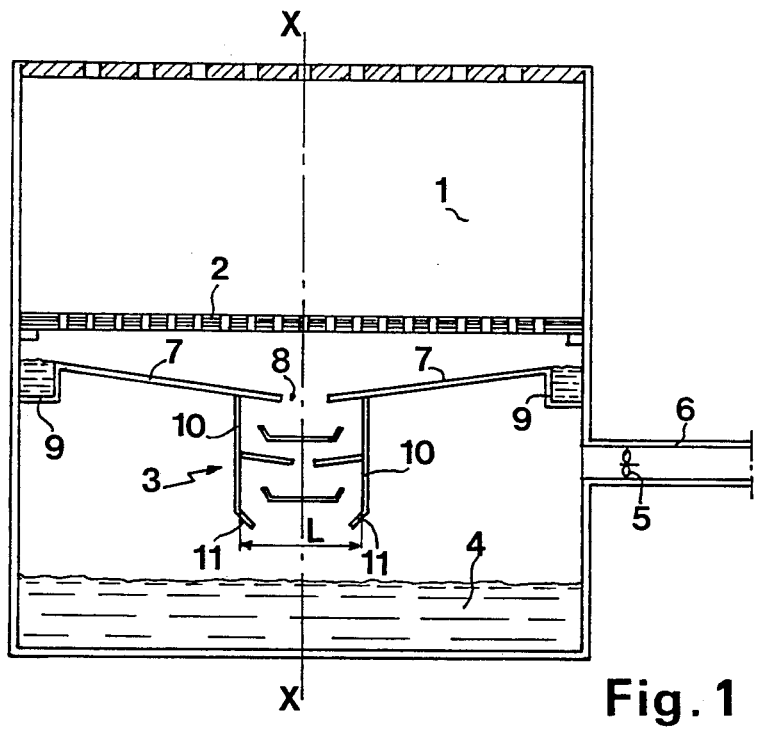
FIG. 1 is a diagrammatic representation, in cross section, of a paint room equipped with a scrubbing device according to the invention.

FIG. 1 shows a paint room comprising an enclosure 1 in which are placed the articles to be painted, and including an open floor 2, a scrubbing device or scrubber 3 according to the invention, and a collection basin or receptacle 4 for the scrubbing liquid, placed beneath scrubber 3, at the bottom of the paint room.

An arrangement is also provided to circulate the polluted gas downward from above through scrubber 3. This arrangement includes a fan 5 for sucking out the gas after the passage thereof into scrubber 3. In the illustrated example, fan 5 is placed in a conduit 6 in one of the side walls of the paint room, between scrubber 3 and the collection basin 4 for the scrubbing liquid.

Figure 2:
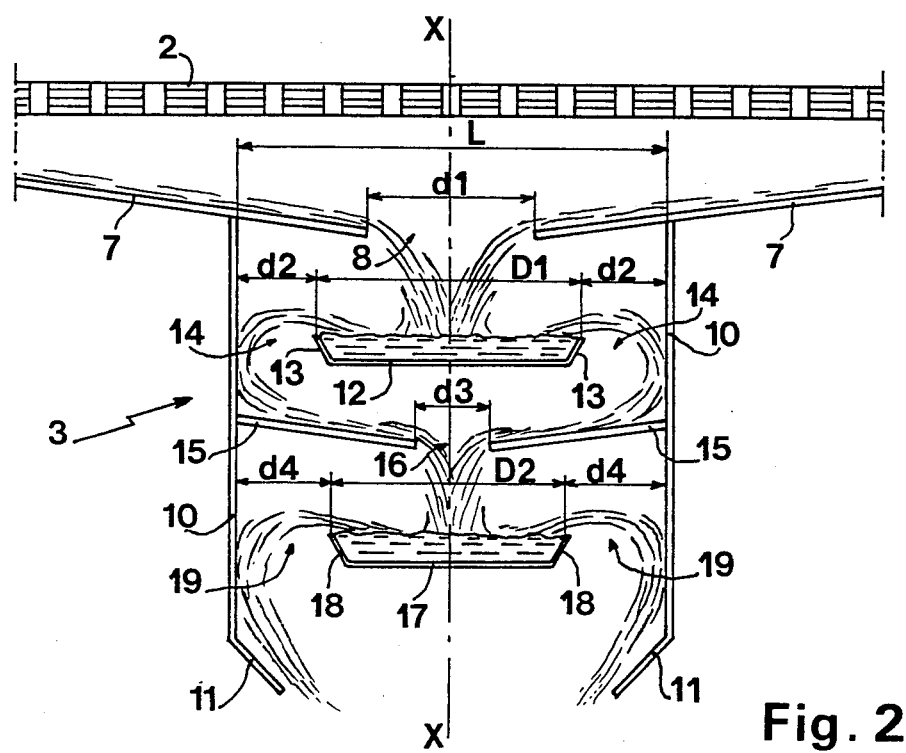
FIG. 2 is a larger scale cross section of the scrubbing device of the paint room shown in FIG. 1.

The scrubbing device or scrubber 3 (as shown in FIGS. 1 and 2) comprise a series of components which will be considered, in succession, beginning from the top down.

These components include inclined trickle walls 7, converging downwardly to form a V. The ends of walls 7 which are remote, the walls of the room, are spaced apart to define an opening 8, of width d1, which extends along the entire length of the room. Trickle walls 7 are fed scrubbing liquid by channels 9 extending along the side walls of the room. These channels are, in turn, supplied with scrubbing liquid from the collection basin 4, by a conventional recycling arrangement (not shown).

Located beneath walls 7 are vertical confining walls 10, which are sealingly attached at the upper ends thereof to the undersides of trickle walls 7 and which terminate at the bottom ends thereof in deflectors 11 which converge downwardly. Walls 10 are arranged symmetrically on either side of opening 8, and are set back from, i.e., spaced from, the edges of opening 8, so that the distance L between walls 10 is greater than the width d1 of opening 8. These walls 10 define a trickle passage with a vertical axis X—X;

Located under opening 8 is a first transverse wall 12, which is horizontal, and of width D1 greater than width d1; Wall 12 is disposed under opening 8 at some distance therefrom, and includes raised edges 13 so that wall 12 is essentially dish-shaped. This wall 12, with confining walls 10, defines lateral or side openings 14 of widths equal to d2. The relation that exists between the widths L, D1, and d2 is evident from FIG. 2, i.e., L=D1+2d2.

The scrubber 3 further includes inclined walls 15, converging downwardly and forming a widely open V; The ends of wall 15 which are most distant from each other are sealingly affixed to confining walls 10 and the other ends thereof define an opening 16, of width d3, which extends the entire length of the room.

Under walls 15 is disposed a second horizontal transverse wall 17, of width D2, which is greater than width d3. Wall 17 is disposed under opening 16 at some distance therefrom, and includes raised edges 18 so that wall 17 thus is essentially dish shaped. Wall 17, together with the confining walls 10, defines side openings 19 of widths equal to d4. The following relation exists between the widths L, D2, d4:L=D2+2d4.

Confining walls 10 can either extend below the level of second transverse wall 17 or terminate at the level of this wall 17.

Figure 3:
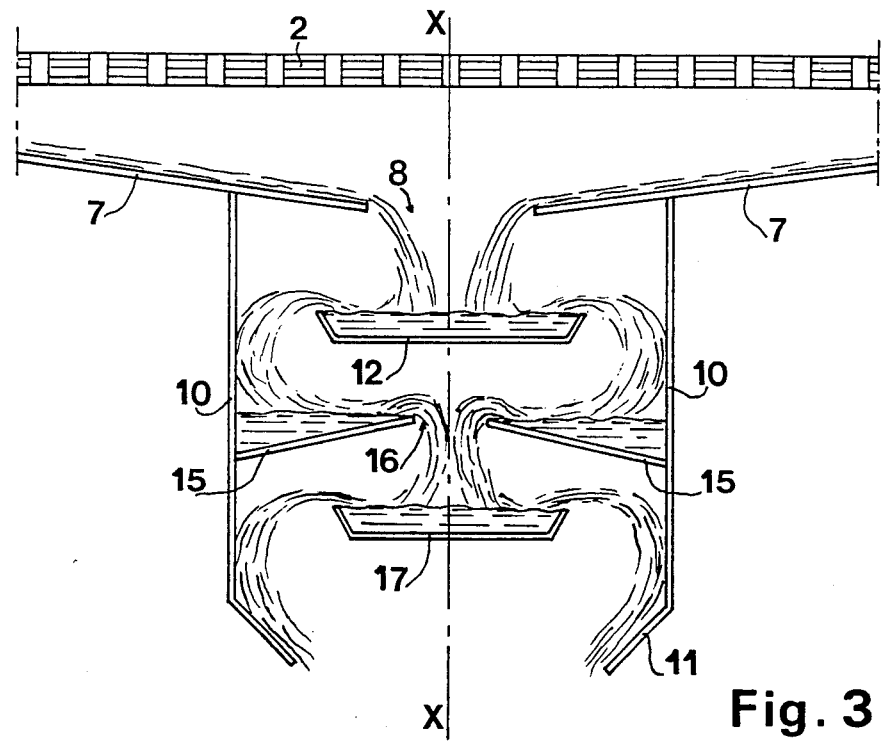
FIG. 3 is a cross section of a first modification of a scrubbing device according to the invention.

FIG. 3 shows a first modification of the embodiment of the scrubber illustrated in FIGS. 1 and 2. In this variation, inclined walls 15 converge upwardly instead of converging downwardly, as in the embodiment described previously. Inclined walls 15, together with confining walls 10, thus form a scrubbing liquid reservoir allowing correct distribution of liquid in opening 16, and thus eliminating problems arising from a poor distribution of scrubbing liquid over trickle walls 7.

Figure 4:
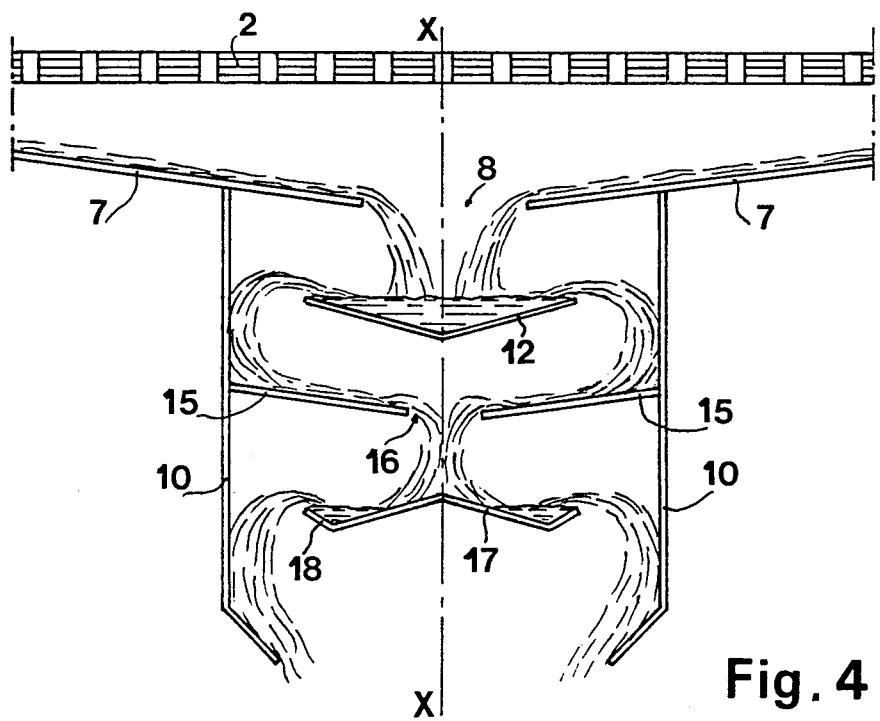
FIG. 4 is a cross section of another modification of a scrubbing device according to the invention.

FIG. 4 shows a second variation of the embodiment of the scrubber according to FIGS. 1 and 2. In this variation, transverse wall 12 is of a V-shape, very open, and the vertex of wall 12 is directed downwardly. Further, the second transverse wall 17 is of very open inverted V-shape and the vertex thereof is directed upwardly. The ends of wall 17 are provided with inclined edges 18 which converge downwardly. In addition, the bottom ends of walls 10 are provided with deflectors 11, as described above.

The operation of these scrubbers is based on the fact that the scrubbing liquid will first trickle down the trickle walls 7, drop or fall through opening 8 onto transverse wall 12, pass on to inclined walls 15 by falling through side openings 14, and drop or fall through side openings 19 before reaching the bottom end of the scrubber where the flow is turned aside by deflectors 11 toward the plane of vertical symmetry of the scrubber and finally reaches collection basin 4. In the course of the flow thereof downwardly from the top, the scrubbing liquid forms a succession of liquid sheets or curtains. The polluted air charged with paint particles, coming from enclosure 1, is aspirated by fan 5 so as to be discharged into the atmosphere. In the course of the passage thereof through the scrubber, this air passes through the successive liquid curtains created by the flow of the scrubbing liquid. In the course of these passes, which create gas-liquid contact, the polluted air is cleared of its paint particles which are then carried by the scrubbing liquid.

The scrubbing device according to the invention is preferably constructed so that:

opening 8 is of width d1 so that the velocity of the air which passes therethrough is between 10 and 20 m/s;

openings 14, on either side of first transverse wall 12, are of width d2 so that the velocity of the air which passes through them is between 8 and 15 m/s;

opening 16 is of width d3 so that the velocity of the air which passes thereof through is between 10 and 50 m/s, this being the opening which creates a considerable loss of charge in the scrubber;

openings 19, on either side of second transverse wall 17, are of width d2 so that the velocity of the air which passes therethrough is between 8 and 15 m/s;

the width D1 of second transverse wall 12 is greater than the width d1 of opening 8; and the width D2 of second transverse wall 17 is greater than the width d3 of opening 16.

In such a scrubbing device, the largest paint particles present in the polluted air are picked up when this air passes through the curtains of scrubbing liquid passing through openings 8 and 14, while the finest paint particles are picked up by the high velocity impact (10 to 50 m/s) of the air flowing through orifice 16 into the scrubbing liquid present on second transverse wall 17.

A number of advantages are provided by the scrubbing device according to the invention, as follows.

Although designed to function with a great loss of charge which may reach 500 millimeters (water column), this device can also be used with low loss of charge while still providing identical collection to that of a scrubber of the prior art type, operating with the same loss of charge.

When the device of the invention operates with great loss of charge, the amounts in the droplets of scrubbing liquid in the air discharged to the outside from the installation are considerably reduced in relation to those which can be measured with a scrubbing device of the prior art type, also operating with an identically large loss of charge. This notable decrease in the pollution of the droplets arises from the fact that the fine droplets generated by the high velocity of the air in opening 16 (10 to 50 m/s) are collected and blended in the curtains of scrubbing liquid flowing through the openings 19 situated on either side of the second transverse wall 17. In addition, the scrubbing liquid which has passed through the scrubber has the flow thereof toward collection basin 4 constricted by deflectors 11.

In operation, the device according to the invention is clearly less noisy than a device of the prior art operating under the same conditions of charge loss. Thus, comparative tests have shown that the intensity of sound emitted by the device according to the invention was 80 dBA while operating with a charge loss of 120 millimeters (water column) and 88 dBA with 460 mm (water column), while under the same operational conditions, the intensities of the sound emitted by a scrubber of the prior art were respectively 86 and 96 dBA. Thus, sound intensity is divided by a factor of 4 in the first case and by approximately 6 in the second case.

Although the present invention has been described relative to exemplary embodiments thereof, it will be understood by those skilled in the art that variations and modifications can be effected in these exemplary embodiments without departing from the scope and spirit of the invention.

We claim:

1. A scrubbing device for scrubbing a polluted gas wherein the polluted gas passes through at least one sheet of a scrubbing liquid, said device comprising trickle walls which define therebetween a first opening; means for feeding scrubbing liquid onto the trickle walls so that the scrubbing liquid trickles down the walls; means for providing circulation of the polluted gas downwardly from above; a first transverse wall disposed beneath the first opening; first and second confining walls, secured at the top ends thereof to the underside of the trickle walls and disposed on either side of the first opening in spaced relation to the edges of said opening, for defining with said transverse wall, a trickle passage surrounding the transverse wall; further walls, disposed inside the trickle passage, and beneath the transverse wall, each of said further walls being attached at one end thereof to one of the confining walls and the other ends of said further walls being spaced apart to define a second opening therebetween; and a further transverse wall disposed beneath the second opening defined between said further walls.

2. A device as claimed in claim 1 characterized in that each of the transverse walls include raised edges, the ends of which define lateral passages which constitute a portion of the trickle passage.

3. A device as claimed in claim 1 wherein the widths of the transverse walls are greater than the widths of the first and second openings, respectively.

4. A device as claimed in claim 1 wherein the further walls are inclined and converge downwardly thereby forming a widely opened V.

5. A device as claimed in claim 1 wherein the further walls are inclined and converge upwardly so as to form, with the confining walls, a scrubbing liquid reservoir.

6. A device as claimed in claim 1 wherein the transverse wall beneath the first opening is of a widely opened V shape, the vertex of which is directed downwardly.

7. A device as claimed in claim 1 wherein the further transverse wall beneath the second opening is of a widely opened inverted V-shape, the vertex of which is directed upwardly and the free ends of which are provided with inclined edges which converge downwardly.

8. A device as claimed in claim 1 wherein the confining walls extend vertically and terminate at the bottom ends thereof in inclined deflectors which converge downwardly.

9. A device as claimed in claim 1 wherein the confining walls are inclined in relation to the vertical, converge downwardly and include, at the bottom ends thereof, inclined deflectors which converge downwardly.

* * * * *